United States Patent
Wu et al.

(10) Patent No.: US 11,743,702 B1
(45) Date of Patent: Aug. 29, 2023

(54) ADVERTISING METHOD AND TERMINAL FOR LOW-POWER BLUETOOTH DEVICES

(71) Applicant: InPlay, Inc., Irvine, CA (US)

(72) Inventors: Qun Wu, Irvine, CA (US); Yongru Gu, Ladera Ranch, CA (US); Jun Tang, Irvine, CA (US); Russell Mohn, Santa Ana, CA (US)

(73) Assignee: INPLAY, INC., Irvine, CA (US)

( * ) Notice: Subject to any disclaimer, the term of this patent is extended or adjusted under 35 U.S.C. 154(b) by 0 days.

(21) Appl. No.: 17/822,914

(22) Filed: Aug. 29, 2022

(51) Int. Cl.
*H04W 4/80* (2018.01)

(52) U.S. Cl.
CPC ..................... *H04W 4/80* (2018.02)

(58) Field of Classification Search
CPC ........................................ H04W 4/80
USPC ..................... 455/41.2, 41.1, 41.3
See application file for complete search history.

(56) References Cited

U.S. PATENT DOCUMENTS

| | | | | |
|---|---|---|---|---|
| 10,716,971 | B1* | 7/2020 | Oberc | A63B 69/36 |
| 11,467,792 | B2* | 10/2022 | Abe | G06F 3/1236 |
| 11,558,725 | B2* | 1/2023 | Raghu | H04W 4/80 |
| 2012/0196534 | A1* | 8/2012 | Kasslin | H04W 76/40 |
| | | | | 455/41.2 |
| 2013/0090061 | A1* | 4/2013 | Linde | H04W 4/80 |
| | | | | 455/41.2 |
| 2013/0109315 | A1* | 5/2013 | Polo | H04W 52/0274 |
| | | | | 455/41.2 |
| 2014/0179233 | A1* | 6/2014 | Kang | H04W 12/06 |
| | | | | 455/41.2 |
| 2014/0355517 | A1* | 12/2014 | Reunamaki | H04W 8/005 |
| | | | | 370/328 |
| 2015/0312858 | A1* | 10/2015 | Kerai | H04W 52/0212 |
| | | | | 370/311 |
| 2016/0050530 | A1* | 2/2016 | Corbalis | G06Q 20/3278 |
| | | | | 455/456.1 |
| 2017/0303070 | A1* | 10/2017 | Batra | H04L 1/00 |
| 2017/0303076 | A1* | 10/2017 | Song | H04L 1/1607 |
| 2019/0116071 | A1* | 4/2019 | VerSteeg | G01D 21/00 |
| 2020/0053831 | A1* | 2/2020 | Park | H04W 8/26 |
| 2020/0100090 | A1* | 3/2020 | Baik | H04W 12/06 |
| 2020/0292399 | A1* | 9/2020 | McMillen | A43B 3/34 |
| 2021/0112392 | A1* | 4/2021 | Ganick | H04W 4/80 |

(Continued)

FOREIGN PATENT DOCUMENTS

CN 111818464 B 8/2021

*Primary Examiner* — Ankur Jain
(74) *Attorney, Agent, or Firm* — Innovation Capital Law Group, LLP; Vic Lin

(57) ABSTRACT

An advertising method for a low-power Bluetooth® device includes driving a finite state machine to obtain a pre-generated or external microcontroller input advertising packet definition; reading in the finite state machine the advertising content and the advertising channel in the advertising packet definition; driving the finite state machine to play the advertising content in the advertising channel. Using the finite state machine, that is, being able to play the advertising content in the advertising packet definition eliminates the need for complicated software development work of the Bluetooth® chip, enabling the Bluetooth® chip to advertising without software development, thus reducing the development cost of the Bluetooth® system, promoting the further wider adoption of low-power Bluetooth® technology, and promoting the development of the Internet of Things.

13 Claims, 3 Drawing Sheets

(56) References Cited

U.S. PATENT DOCUMENTS

| | | | |
|---|---|---|---|
| 2021/0315031 A1* | 10/2021 | Wu | A61N 1/37252 |
| 2022/0022745 A1* | 1/2022 | Wu | A61N 1/37276 |
| 2022/0232361 A1* | 7/2022 | Pattnayak | H04W 76/10 |
| 2022/0256308 A1* | 8/2022 | Volkerink | G06Q 10/0833 |
| 2022/0354435 A1* | 11/2022 | Samejima | A61B 5/332 |
| 2023/0007560 A1* | 1/2023 | Aoki | H04W 36/30 |

* cited by examiner

| Advertising interval | Advertising Channels | Field 1 | Field 2 | ••• | Field N |

FIG. 2

| Source | length | Value of byte 1 | Value of byte 2 | ••• | Value of byte M |

FIG. 3

ADVERTISING METHOD AND TERMINAL FOR LOW-POWER BLUETOOTH DEVICES

BACKGROUND OF THE INVENTION

1. Field of the Invention

Embodiments of the invention relate generally to wireless communication. More particularly, embodiments of the invention relate to a method and terminal for a low-power Bluetooth® device.

2. Description of Prior Art and Related Information

The following background information may present examples of specific aspects of the prior art (e.g., without limitation, approaches, facts, or common wisdom) that, while expected to be helpful to further educate the reader as to additional aspects of the prior art, is not to be construed as limiting the present invention, or any embodiments thereof, to anything stated or implied therein or inferred thereupon.

BLE (Bluetooth® low energy) is a new generation of wireless communication that aims to maintain the same communication range while significantly reducing power consumption and cost compared to classic Bluetooth® technology.

Based on the advantages of low power consumption and low cost of low-power Bluetooth® technology, low-power Bluetooth® technology is widely used in the Internet of Things.

However, because the Bluetooth® protocol stack is more complex, making the low-power Bluetooth® software development difficult, low-power Bluetooth® developers need to spend substantial time on the Bluetooth® chip software for secondary development in order to perform advertising, thus increasing the development cost of the Bluetooth® system. This can hinder the further popularization of low-power Bluetooth® applications and the development of the Internet of things, thus resulting in an overall negative impact on the development of the Internet of Things.

In view of the foregoing, there is a need for an improved advertising method for a Bluetooth® device.

SUMMARY OF THE INVENTION

In view of the foregoing, the present application provides an advertising method and a terminal for a low-power Bluetooth® device to solve the existing problem that the software of the Bluetooth® chip takes a long time for secondary development, thus increasing the development cost of the Bluetooth® system, thus hindering the further popularization and application of low-power Bluetooth® technology, and negatively affecting the development of the Internet of Things.

The present application provides an advertising method for a low-power Bluetooth® device comprising receiving and storing a pre-generated or microcontroller chip real-time input advertising packet definition from a user side input using a memory; driving a finite state machine to obtain the advertising packet definition; reading advertising content and a advertising channel in the advertising packet definition in the finite state machine; and playing the advertising content in the advertising channel.

In some embodiments, the method of implementation further includes reading, in the finite state machine, an advertising interval in the advertising packet definition and obtaining a random number from a pseudo-random binary sequence generator; using the advertising interval and the sum of the random number as a timed hibernation time; and playing the advertising content at intervals of the timed hibernation time.

In some embodiments, the method of generating an advertising packet definition includes obtaining advertising content, an advertising interval and an advertising channel stored in memory; generating a field group from the advertising content, the field group comprising at least one field; and sequentially arranging the advertising interval, advertising channel and each field in the field group to generate the advertising packet definition.

In some embodiments, the reading of the advertising content and advertising channel in the advertising packet definition in a finite state machine includes obtaining the advertising channel and field group in the advertising packet definition; parsing the field group and generating the advertising content, the advertising content including a source of data occurrence at the time of storing the advertising packet definition, a number of bytes of advertising content and a byte value for each of the number of bytes.

In some embodiments, using the memory to receive and store the pre-generated advertising packet definition from user-side input includes using non-volatile memory and random memory to store the advertising packet definition. The driving of the finite state machine to obtain the pre-generated advertising packet definition includes obtaining the advertising packet definition from non-volatile memory; and if the advertising packet definition is not obtained from non-volatile memory, obtaining the advertising packet definition from random access memory.

In some embodiments, each byte count contains byte values that are dynamic or static values.

Embodiments of the present application also provides a low-power Bluetooth® device terminal comprising a finite state machine electrically connected, without a CPU (central processing unit), and a memory; the memory is electrically connected to the finite state machine, the memory is used to store an advertising packet definition, and the memory is not stored or burned into any software program; the finite state machine is used to read the advertising channel and advertising content in the advertising packet definition stored in the memory to enable user to advertising using the low-power Bluetooth® device terminal without any software development and without compiling the connected software code to be stored in any of the memories.

In some embodiments, the low power Bluetooth® device terminal further includes a pseudo-random binary sequence generator and a hibernation timer; the pseudo-random binary sequence generator is electrically connected to the finite state machine for generating a random number; the hibernation timer is electrically connected to the finite state machine and the hibernation timer for summing an advertising interval read by the finite state machine from a advertising packet definition and a random number generated by the pseudo-random binary sequence generator as a timed hibernation time, and advertising the advertising content at timed hibernation intervals.

In some embodiments, the low-power Bluetooth® terminal further includes an input-output port, a temperature sensor, and a power sensor; the input-output port is electrically connected to the finite state machine for electrically connecting to an external data source via a data cable to obtain advertising content in the external data source as advertising content in the advertising package definition or for outputting status data of the low-power Bluetooth® terminal to the external device; the temperature sensor is electrically connected to the finite state machine electrically connected for using the data sensed by the temperature sensor as the advertising content in the advertising package definition; and the power sensor electrically connected to the finite state machine for using the data of the power supply as the advertising content in the advertising package definition.

In some embodiments, the memory includes a non-volatile memory and a random-access memory; the non-volatile memory is electrically connected to a finite state machine for storing an advertising packet definition pre-burned or deposited by a user; and the random-access memory is electrically connected to a finite state machine for receiving an advertising packet definition written by an external microcontroller chip.

The advertising method and terminal of the low-power Bluetooth® device described herein, after storing an advertising package definition with a memory, is able to play the advertising content in the advertising package definition by using a finite state machine, thus eliminating the need for secondary development of the Bluetooth® chip, enabling the Bluetooth® chip to advertising without software development, thereby reducing the development cost of the Bluetooth® system, and thus promoting further low-power Bluetooth® popular application, and thus promoting the development of the Internet of Things.

Embodiments of the present invention provide a method for advertising from a low-power Bluetooth® device comprising receiving and storing a pre-generated or a real-time input of an advertising packet definition from a user-side input or from the microcontroller chip into a memory; driving a finite state machine to obtain the advertising packet definitions; reading advertising content and an advertising channel in the advertising packet definition in the finite state machine; and advertising the advertising content in the advertising channel from the low-power Bluetooth® device, wherein a mode of operation of the low-power Bluetooth® device is one of a stand-alone-state machine driven mode or a driven by an external host controller mode Embodiments of the present invention further provide a low-power Bluetooth® device terminal comprising a finite state machine and memory without a central processing unit (CPU) electrical connection; the memory is electromechanically connected to the finite state machine, the memory is operable to store an advertising package definition, and the memory does not store or burn in any software program; the finite state machine is operable to read an advertising channel and advertising content from the advertising packet definition stored in the memory to enable the user to advertising using the low power Bluetooth® device terminal without any software development and without compiling software code stored in any memory after connection; and the finite state machine is operable in one of a first mode of operation and a second mode of operation, wherein the first mode of operation is a stand-alone-state machine driven mode and the second mode of operation is a driven by an external host controller mode.

These and other features, aspects and advantages of the present invention will become better understood with reference to the following drawings, description and claims.

BRIEF DESCRIPTION OF THE DRAWINGS

Some embodiments of the present invention are illustrated as an example and are not limited by the figures of the accompanying drawings, in which like references may indicate similar elements.

FIG. 2 is a schematic block diagram of the structure of an advertising packet definition for an advertising method of a low-power Bluetooth® device of an embodiment of the present application;

FIG. 3 is a schematic block diagram of the structure of a field of an advertising method for a low-power Bluetooth® device of an embodiment of the present application.

Figure 1:
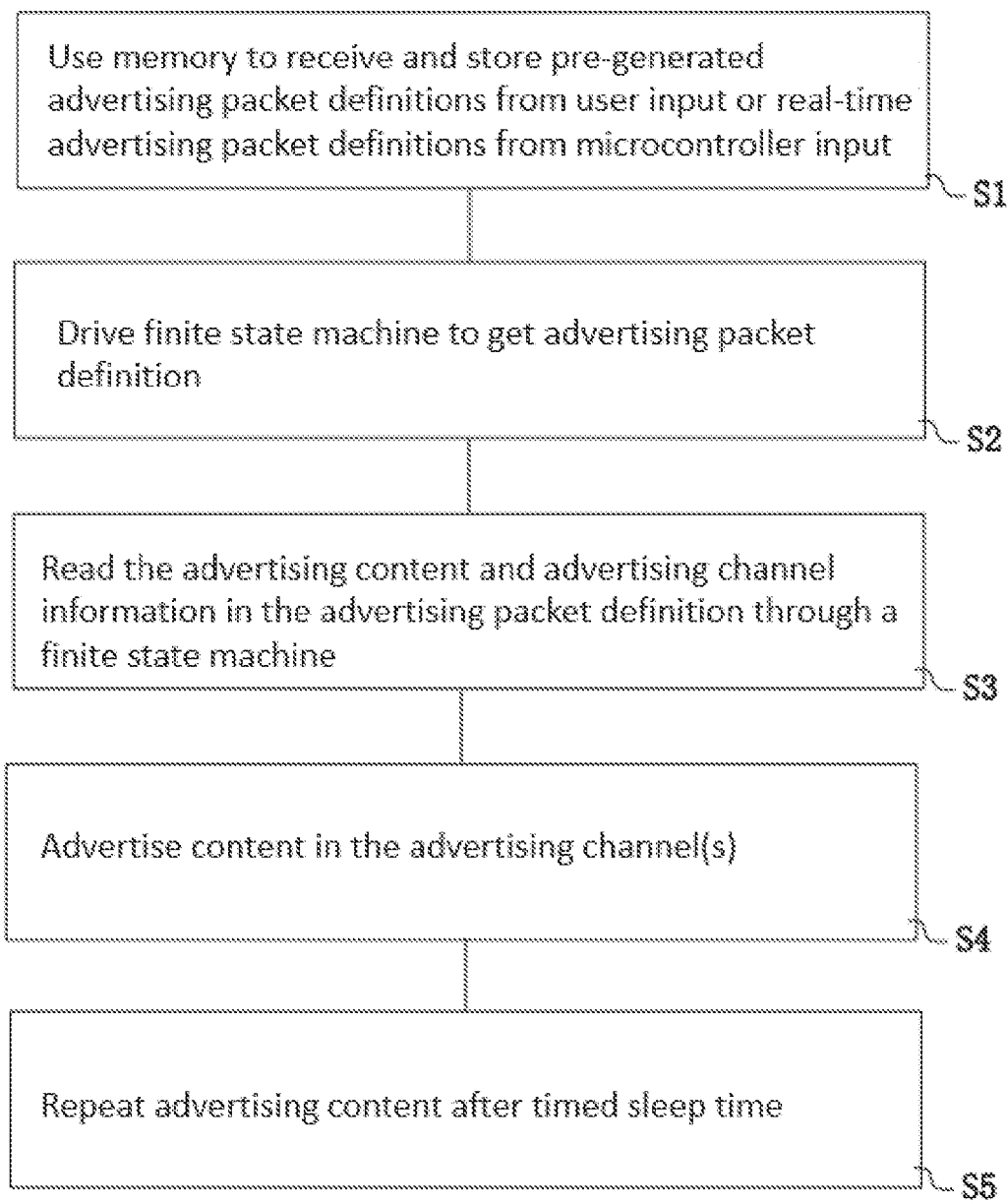
FIG. 1 is a schematic block diagram of the flow of an advertising method for a low-power Bluetooth® device of an embodiment of the present application.

Unless otherwise indicated illustrations in the figures are not necessarily drawn to scale.

The invention and its various embodiments can now be better understood by turning to the following detailed description wherein illustrated embodiments are described. It is to be expressly understood that the illustrated embodiments are set forth as examples and not by way of limitations on the invention as ultimately defined in the claims.

DETAILED DESCRIPTION OF THE PREFERRED EMBODIMENTS AND BEST MODE OF INVENTION

The terminology used herein is for the purpose of describing particular embodiments only and is not intended to be limiting of the invention. As used herein, the term "and/or" includes any and all combinations of one or more of the associated listed items. As used herein, the singular forms "a," "an," and "the" are intended to include the plural forms as well as the singular forms, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

Unless otherwise defined, all terms (including technical and scientific terms) used herein have the same meaning as commonly understood by one having ordinary skill in the art to which this invention belongs. It will be further understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein.

In describing the invention, it will be understood that a number of techniques and steps are disclosed. Each of these has individual benefit and each can also be used in conjunction with one or more, or in some cases all, of the other disclosed techniques. Accordingly, for the sake of clarity, this description will refrain from repeating every possible combination of the individual steps in an unnecessary fashion. Nevertheless, the specification and claims should be read with the understanding that such combinations are entirely within the scope of the invention and the claims.

In the following description, for purposes of explanation, numerous specific details are set forth in order to provide a thorough understanding of the present invention. It will be evident, however, to one skilled in the art that the present invention may be practiced without these specific details.

The present disclosure is to be considered as an exemplification of the invention and is not intended to limit the invention to the specific embodiments illustrated by the figures or description below.

As is well known to those skilled in the art, many careful considerations and compromises typically must be made when designing for the optimal configuration of a commercial implementation of any system, and in particular, the embodiments of the present invention. A commercial implementation in accordance with the spirit and teachings of the present invention may be configured according to the needs of the particular application, whereby any aspect(s), feature(s), function(s), result(s), component(s), approach(es), or step(s) of the teachings related to any described embodiment of the present invention may be suitably omitted, included, adapted, mixed and matched, or improved and/or optimized by those skilled in the art, using their average skills and known techniques, to achieve the desired implementation that addresses the needs of the particular application.

Broadly, embodiments of the present invention provide an advertising method for a low-power Bluetooth® device that includes driving a finite state machine to obtain a pre-generated or external microcontroller input advertising packet definition; reading in the finite state machine the advertising content and the advertising channel in the advertising packet definition; driving the finite state machine to play the advertising content in the advertising channel. Using the finite state machine, that is, being able to play the advertising content in the advertising packet definition eliminates the need for complicated software development work of the Bluetooth® chip, enabling the Bluetooth® chip to advertising without software development, thus reducing the development cost of the Bluetooth® system, promoting the further wider adoption of low-power Bluetooth® technology, and promoting the development of the Internet of Things.

Referring to FIG. 1, an embodiment of the present application provides an advertising method for a low-power Bluetooth® device, comprising, in step S1, receiving and storing a pre-generated or microcontroller chip real-time input advertising packet definition from a user side input using a memory. At step S2, the method can drive a finite state machine to obtain the advertising packet definition. At step S3, the method can read the advertising content and advertising channel in the advertising packet definition in the finite state machine. In step S4, the method can advertise the advertising content in the advertising content in the advertising channel.

When the user needs to play the advertising, the user can simply record or input the data needed for the advertising packet definition into the memory, where the finite state machine can get the advertising packet definition from the memory, read the advertising content and advertising channel in the advertising packet definition, and play the advertising content in the advertising channel. The whole process of advertising does not require any central processor (e.g., no ARM series processor, no RISC-V processor, or the like), nor does it require read-only memory (ROM) to store the firmware or application, nor does it require non-volatile memory (non-volatile memory) to store the firmware or application, nor does it require random access memory (RAM) to store the firmware or application. It is necessary to record or input the advertising package definition into the memory, so there is no need to develop any software and compile the connection and then burn or store it into any memory, and there is no need for secondary development of the Bluetooth® chip, thus reducing the development cost of the Bluetooth® system, and thus promoting the further popular application of low-power Bluetooth® technology, and thus promoting the development of the Internet of Things.

In some embodiments, the Bluetooth® low energy device can receive configuration commands and data through a computer wired interface, such as a universal asynchronous receiver/transmitter (UART) or a universal serial bus (USB), or through a wireless interface, such as a Bluetooth® interface. Such commands and data can be processed by the finite state machine of the device to store or use as advertising parameters or advertising data. This aspect of the present invention provides a new way for developers to configure and program Bluetooth® low energy devices. The traditional development approach is to compile the software on a PC using a third-party software tool and then download the program into the memory of the Bluetooth® low energy device for operation. Aspects of the present invention provide a simple configuration approach via PC GUI, for example, which will eliminate the requirement for developers to purchase any expensive software compilers and development tools.

The advertising method of the low-power Bluetooth® device further comprises, at step s5, repeating the advertising content after a timed hibernation time.

By playing the advertising content after the timed sleep time, methods of the present application are able to repeat the advertising that the user needs to play without the user having to enter the data needed for the definition of the advertising packet multiple times, thus again simplifying the process of advertising and being able to further reduce the development cost, thus promoting the further popular application of low-power Bluetooth® technology and thus the development of the Internet of Things.

In some embodiments, the repeating the advertising content after the timed hibernation time includes reading the advertising interval in the advertising packet definition in the finite state machine and obtaining a random number from the pseudo-random binary sequence generator. The sum of the advertising interval and the random number can be used as the timed hibernation time, where the advertising content can be played, for example, every other timed hibernation time.

The method of generating an advertising packet definition includes obtaining the advertising content, advertising interval and advertising channel stored in the memory, and generating a field group from the advertising content. The field group can contain at least one field. The method further includes arranging the advertising interval, the advertising channel and each field in the field group, in turn, to generate an advertising packet definition.

In some embodiments, the Bluetooth® low energy device can receive a radio frequency (RF) signal from a remote device and parse such information through its finite state machine to activate or de-activate the current advertising activities pre-defined by the parameters stored in the memory of the device. This can provide a way to start/stop advertising from a remote Bluetooth® device. A wakeup radio feature is thus provided that works with the finite state machine. The RF receiver is different from traditional receiver designs because it only receives the preamble signal from the remote radio device and parses the address information in it to see if it matches the address of the Bluetooth® low energy device. Once matched, the device's finite state machine activates/deactivates the advertising activities based on the commands received.

Referring to FIG. 2, the advertising packet definition includes the advertising interval, the advertising channel, and each field in the field group.

Reading the advertising content and advertising channel in the advertising packet definition in the finite state machine includes obtaining the advertising channel and field group in the advertising packet definition, parsing the field group and generating the advertising content, which includes the source of data occurrence at the time of storing the advertising packet definition, the number of bytes of the advertising content and the byte value of each byte.

One of the advertising contents played by the low-power Bluetooth® chip, which can also be called an advertising packet, includes a bootstrap code (preamble), an access address (access address), a protocol data unit (PDU), and a cyclic redundancy check code (CRC). Each component is composed of multiple bytes.

In contrast, in the system and methods of the present application, the entire advertising packet is divided into multiple fields, each including multiple bytes, and these fields, the advertising interval, and the advertising channel form the definition of the advertising packet, according to which the finite state machine assembles an advertising packet and advertise it on the selected channel.

Referring to FIG. 3, a field may be defined by example as follows: the source of the byte value in that field, the field has multiple bytes (number of bytes), and if the source is the corresponding memory, the number of bytes followed by the byte value of the field, in order, the above source, the number of bytes and the byte value, make up a field.

In some embodiments, each byte count contains byte values that are dynamic or static, and the sources of the byte values may not be the same for each field, so that these byte values may be dynamic or static. In the present invention these sources include, but are not limited to, memory, GPIOs (general purpose input and output ports), chip internal temperature sensors, chip power sensors, pseudo-random numbers, and external sensors, wherein the chip internal temperature sensors sense the temperature and generates a byte value that is a dynamic byte value.

In a field definition, there are three items (source, byte count, byte value). Obviously, the presence or absence of byte count and byte value depends on the source. Some items can be absent. For example, when the source is a 16-bit temperature sensor, it is implied that the byte count is two (therefore, no byte count item is needed to compose the field), at the same time, the byte value is read directly from the temperature sensor side, so the byte value item is not present.

Receiving and storing a pre-generated advertising packet definition from user-side input using memory includes storing the advertising packet definition using non-volatile memory and random memory. Driving the finite state machine to obtain the pre-generated advertising packet definition includes obtaining the advertising packet definition from non-volatile memory and obtaining the advertising packet definition from random access memory if the advertising packet definition is not obtained from non-volatile memory.

In this embodiment, the advertising content may be defined in non-volatile memory or in random access memory, the definition of the advertising packet is read in the corresponding memory and subsequently advertised on the selected channel. The definition of the advertising packet may be pre-burned or deposited in non-volatile memory or may be written (including changed in real time) in random access memory by a MCU (microcontroller) chip in real time, or may be written once (without real-time changes) to random access memory by a MCU (microcontroller) chip.

This embodiment provides an advertising method for a low-power Bluetooth® device, which works or processes as follows: it is only necessary to record or input the advertising package definition into a memory when a user needs to play an advertising, and thus there is no need to develop any software and compile a connection and then burn or deposit it into any memory. Further, there is no need for secondary development of the Bluetooth® chip, making the Bluetooth® chip capable of advertising without software development. This reduces the development cost of the Bluetooth® system and therefore promotes the further popularization and application of low-power Bluetooth® technology, thus promoting the development of the Internet of Things.

Figure 4:
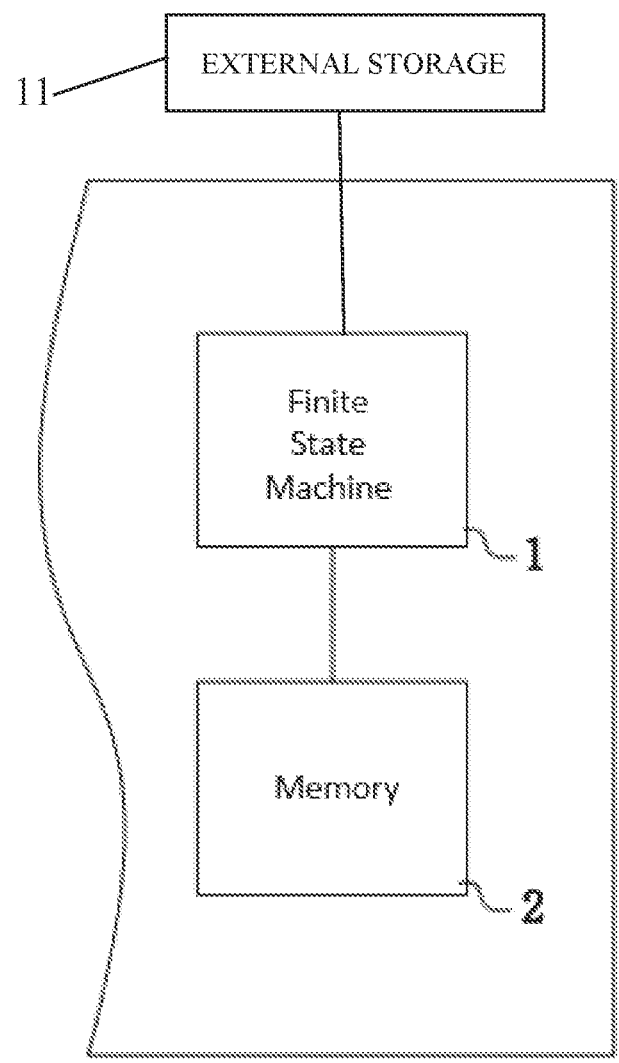
FIG. 4 is a schematic block diagram of the structure of a low-power Bluetooth® device terminal of an embodiment of the present application.

Referring to FIG. 4, embodiments of the present application further provide a low-power Bluetooth® device terminal comprising a finite state machine 1 electrically connected, without a CPU (central processing unit), and a memory 2. The memory 2 is electrically connected to the finite state machine 1, the memory 2 is used to store an advertising package definition, and the memory 2 is not stored or burned into any software program. The finite state machine 1 is used to read the advertising package definition stored in the memory 2 and the advertising channel and advertising content stored in memory 2 to enable a user to advertise using the low-power Bluetooth® device terminal without any software development and without compiling and storing the connected software code in any memory.

The finite state machine 1 can obtain the advertising packet definition in the memory 2 and read the advertising content and the advertising channel in the advertising packet definition, thereby playing the advertising content through the advertising channel. When the user needs to play the advertising, only the data needed for the advertising packet definition can be entered or input into the memory 2. The low-power Bluetooth® device terminal, which includes the finite state machine 1 and the memory 2, can then automatically play the advertising. Thus, the low-power Bluetooth® device terminal provided by the present application does not require secondary development, thereby reducing the development cost of the Bluetooth® system, and thus promoting the further popular application of low-power Bluetooth® technology, and thus promoting the development of the Internet of Things.

The low-power Bluetooth® terminal further comprises a pseudo-random binary sequence generator and a hibernation timer. The pseudo-random binary sequence generator is electrically connected to the finite state machine 1 for generating a random number while the hibernation timer is electrically connected to the finite state machine 1 and is used for providing a sum of an advertising interval read by the finite state machine 1 from an advertising packet definition and a random number generated by the pseudo-random binary sequence generator as a timed hibernation time. The terminal can advertise the advertising content every other timed hibernation time, for example.

By using a pseudo-random binary sequence generator and a hibernation timer, it is possible to repeat the advertising that the user needs to play without the user having to enter the data needed for the definition of the advertising packet multiple times, thus again simplifying the process of advertising and being able to further reduce development costs, thus promoting the further popular use of low-power Bluetooth® technology and thus the development of the Internet of Things.

The low-power Bluetooth® terminal further comprises an input-output port, a temperature sensor and a power sensor. The input-output port is electrically connected to the finite-state machine 1 for electrically connecting to an external data source via a data cable to obtain advertising content in the external data source as advertising content in the advertising package definition. In some embodiments, the input-output port can be used for outputting status data of the low-power Bluetooth® terminal to the external device. The temperature sensor is electrically connected to the finite-state machine 1 for using the data sensed by the temperature sensor as the advertising content in the advertising package definition. The power sensor is electrically connected to the finite state machine 1 for using the data of the power supply as the advertising content in the advertising package definition.

In this embodiment, the input and output ports are GPIO (general purpose input and output port), the temperature sensor is the chip internal temperature sensor, and the power sensor is the chip power sensor. By using GPIO ports, it is possible to obtain advertising content in the external data source for the low-power Bluetooth® terminal external sensor, or for outputting data from the low-power Bluetooth® terminal to an external device, thus increasing the advertising content of the source method.

In some embodiments, the Bluetooth® low energy device's finite state machine can obtain the measurement data from the external sensors, such as the temperature sensor, then store the data to an external storage device 11, such as a flash memory device, through its serial bus interface such as I2C, serial peripheral interface (SPI) or UART. The storage, being external storage and not the internal storage of the device, can prove useful when, for example, the user wants to log the measurements (e.g., temperature) over a long period of time, such as a month's worth of measurements. The internal memory storage in the Bluetooth® low energy device often cannot afford such a high memory density. An interface 12 for the external storage device 11 can be connected to the finite state machine and is operable to store data acquired from at least one sensor source connected to the low-power Bluetooth® device to the external storage device.

The memory 2 includes a non-volatile memory and a random-access memory. The non-volatile memory is electrically connected to the finite state machine 1 for storing advertising packet definitions pre-burned or deposited by the user. The random-access memory is electrically connected to the finite state machine 1 for receiving advertising packet definitions written by the microcontroller chip.

In this embodiment, the advertising packet definition may be pre-burned or deposited in non-volatile memory, or may be written in real-time (including real-time changes) to random-access memory by an MCU (microcontroller) chip, or may be written once (without real-time changes) to random-access memory by an MCU (microcontroller) chip. All three writing methods, increasing the access of the user to write the advertising packet definition, makes it easier for the user to write the advertising packet definition, thus reducing the time it takes for the user to write the advertising packet definition and further reducing the development cost of the Bluetooth® system.

As discussed above, the device is capable of operating in a standalone mode and does not require an external processor or microcontroller to act as the host controller. Traditional designs of Bluetooth® low energy devices typically have an internal microcontroller to perform protocol and data parsing tasks. Aspects of the present invention does not require either an internal microcontroller or an external host controller. The device of the present invention can operate as a fully state machine-driven design, that supports both standalone operation mode and external host controller mode. In other words, the mode of operation of the device can be stand-alone, state machine driven or driven by an external host controller.

Although the present application has been shown and described with respect to one or more embodiments, equivalent variants and modifications will be contemplated by those skilled in the art based on a reading and understanding of this specification and the accompanying drawings. The present application includes all such modifications and variants and is limited only by the scope of the appended claims. In particular with respect to the various functions performed by the components, the terminology used to describe such components is intended to correspond to any component (unless otherwise indicated) that performs a specified function of the component (e.g., which is functionally equivalent), even if not structurally equivalent to the disclosed structure for performing the function in the exemplary embodiments of this specification shown herein.

In other words, the foregoing is only an example of the present application and is not intended to limit the scope of the patent of the present application. Any equivalent structure or equivalent process transformation using the contents of the specification of the present application and the accompanying drawings, such as the combination of technical features among the embodiments or the direct or indirect application in other related technical fields, is included in the scope of patent protection of the present application in the same way.

In the present application, the word "exemplary" is used to mean "used as an example, illustration or description". Any one embodiment described as "exemplary" in this application is not necessarily to be construed as being more preferred or advantageous than other embodiments. The foregoing description is given for the purpose of enabling any person skilled in the art to implement and use the present application. In the above description, various details are set forth for the purpose of explanation. It should be appreciated that one of ordinary skill in the art will recognize that the present application can be realized without the use of these particular details. In other embodiments, structures and processes that are well known will not be elaborated upon to avoid unnecessary details that would obscure the description of the present application. Accordingly, the present application is not intended to be limited to the embodiments shown, but is consistent with the broadest scope consistent with the principles and features disclosed in the present application.

Claim elements and steps herein may have been numbered and/or lettered solely as an aid in readability and understanding. Any such numbering and lettering in itself is not intended to and should not be taken to indicate the ordering of elements and/or steps in the claims.

The words used in this specification to describe the invention and its various embodiments are to be understood not only in the sense of their commonly defined meanings, but to include by special definition in this specification the generic structure, material or acts of which they represent a single species.

The definitions of the words or elements of the following claims are, therefore, defined in this specification to not only include the combination of elements which are literally set forth. In this sense it is therefore contemplated that an equivalent substitution of two or more elements may be made for any one of the elements in the claims below or that a single element may be substituted for two or more elements in a claim. Although elements may be described above as acting in certain combinations and even initially claimed as such, it is to be expressly understood that one or more elements from a claimed combination can in some cases be excised from the combination and that the claimed combination may be directed to a subcombination or variation of a subcombination.

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

The claims are thus to be understood to include what is specifically illustrated and described above, what is conceptually equivalent, what can be obviously substituted and also what incorporates the essential idea of the invention.

What is claimed is:

1. A method for advertising from a low-power Bluetooth® device, comprising:
    receiving and storing a pre-generated or a real-time input of an advertising packet definition from a user-side input or from the microcontroller chip into a memory;
    driving a finite state machine to obtain the advertising packet definitions;
    reading advertising content and an advertising channel in the advertising packet definition in the finite state machine;
    advertising the advertising content in the advertising channel from the low-power Bluetooth® device;
    reading an advertising interval in the advertising packet definition in the finite state machine;
    obtaining a random number from a pseudo-random binary sequence generator;
    summing the advertising interval and the random number to obtain a timed resting time;
    playing the advertising content at timed sleep intervals defined by the timed resting time; and
    generating the advertising packet definition by steps comprising:
        accessing the advertising content, the advertising interval and the advertising channel stored in the memory;
        generating the advertising content into a field group, the field group containing at least one field; and
        sequentially arranging each of the advertising interval, the advertising channel and the field group to generate the advertising packet definition, wherein
    a mode of operation of the low-power Bluetooth® device is one of a stand-alone autonomous mode, where the finite state machine can autonomously drive itself, or where the finite state machine is driven by an external host controller mode.

2. The advertising method according to claim 1, wherein reading of the advertising content and advertising channel in the advertising packet definition in the finite state machine comprises:
    obtaining the advertising channel and the field group in the advertising packet definition; and
    parsing the field group to generate the advertising content, the advertising content comprising a source of data occurrence at a time of storing the advertising packet definition, a number of bytes of advertising content, and a byte value for each of the number of bytes.

3. The advertising method according to claim 2, wherein each of the byte count contains byte values that are dynamic values or static values.

4. The advertising method according to claim 1, wherein a definition of a pre-generated advertising packet using the memory to receive and store input from a user side includes:
    using at least one of non-volatile memory and random-access memory to store advertising package definitions;
    wherein driving the finite state machine to obtain the pre-generated advertising packet definition comprises:
    obtaining the advertising packet definition from the non-volatile memory; and
    if the advertising packet definition is not obtained from the non-volatile memory, the obtaining the advertising packet definition from the random-access memory.

5. The advertising method according to claim 1, further comprising receiving configuration commands and data into the low-power Bluetooth® device through a computer wired interface.

6. The advertising method according to claim 5, wherein the configuration commands and data are processed by the finite state machine for storage in the memory or for use as advertising parameters or advertising data.

7. The advertising method according to claim 1, further comprising receiving configuration commands and data into the low-power Bluetooth® device through a wireless interface.

8. The advertising method according to claim 1, further comprising receiving, by the low-power Bluetooth® device, a radio frequency signal from a remote device for activation or de-activation of current advertising activities.

9. The advertising method according to claim 8, further comprising receiving, in the radio frequency signal, only a preamble signal from the remote device and parsing address information in the preamble signal to determine if the address information matches an address of the low-power Bluetooth® device.

10. The advertising method according to claim 1, further comprising receiving data in the low-power Bluetooth® device from one or more sensors.

11. The advertising method according to claim 10, further comprising storing data from the one or more sensors into an external storage device.

12. A method for advertising from a low-power Bluetooth® device, comprising:
    receiving and storing a pre-generated or a real-time input of an advertising packet definition from a user-side input or from the microcontroller chip into a memory;
    driving a finite state machine to obtain the advertising packet definitions;
    reading advertising content and an advertising channel in the advertising packet definition in the finite state machine;
    advertising the advertising content in the advertising channel from the low-power Bluetooth® device;
    reading an advertising interval in the advertising packet definition in the finite state machine;
    using the advertising interval to obtain a timed resting time;
    playing the advertising content at timed sleep intervals defined by the timed resting time; and
    generating the advertising packet definition by steps comprising:
        accessing the advertising content, the advertising interval and the advertising channel stored in the memory;

generating the advertising content into a field group, the field group containing at least one field; and sequentially arranging each of the advertising interval, the advertising channel and the field group to generate the advertising packet definition, wherein a mode of operation of the low-power Bluetooth® device is one of a stand-alone autonomous mode, where the finite state machine can autonomously drive itself, or where the finite state machine is driven by an external host controller mode.

13. A method for advertising from a low-power Bluetooth® device, comprising:

receiving and storing a pre-generated or a real-time input of an advertising packet definition from a user-side input or from the microcontroller chip into a memory;

driving a finite state machine to obtain the advertising packet definitions;

reading advertising content and an advertising channel in the advertising packet definition in the finite state machine;

advertising the advertising content in the advertising channel from the low-power Bluetooth® device;

reading an advertising interval in the advertising packet definition in the finite state machine;

using the advertising interval to obtain a timed resting time;

playing the advertising content at timed sleep intervals defined by the timed resting time; and generating the advertising packet definition by steps comprising:

accessing the advertising content, the advertising interval and the advertising channel stored in the memory;

generating the advertising content into a field group, the field group containing at least one field; and sequentially arranging each of the advertising interval, the advertising channel and the field group to generate the advertising packet definition, wherein reading of the advertising content and advertising channel in the advertising packet definition in the finite state machine comprises:

obtaining the advertising channel and the field group in the advertising packet definition; and parsing the field group to generate the advertising content, the advertising content comprising a source of data occurrence at a time of storing the advertising packet definition, a number of bytes of advertising content, and a byte value for each of the number of bytes, and, wherein a mode of operation of the low-power Bluetooth® device is one of a stand-alone autonomous mode, where the finite state machine can autonomously drive itself, or where the finite state machine is driven by an external host controller mode.

\* \* \* \* \*